United States Patent
Seo et al.

(10) Patent No.: US 9,712,995 B2
(45) Date of Patent: Jul. 18, 2017

(54) METHOD AND DEVICE FOR PERFORMING GROUP COMMUNICATION USING DIRECT COMMUNICATION BETWEEN TERMINALS IN WIRELESS COMMUNICATION SYSTEM

(71) Applicant: LG ELECTRONICS INC., Seoul (KR)

(72) Inventors: Hanbyul Seo, Anyang-si (KR); Byounghoon Kim, Anyang-si (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/650,830

(22) PCT Filed: Dec. 17, 2013

(86) PCT No.: PCT/KR2013/011730
§ 371 (c)(1),
(2) Date: Jun. 9, 2015

(87) PCT Pub. No.: WO2014/098446
PCT Pub. Date: Jun. 26, 2014

(65) Prior Publication Data
US 2015/0334555 A1    Nov. 19, 2015

Related U.S. Application Data

(60) Provisional application No. 61/740,425, filed on Dec. 20, 2012, provisional application No. 61/750,322, (Continued)

(51) Int. Cl.
*H04L 12/28* (2006.01)
*H04W 8/18* (2009.01)
(Continued)

(52) U.S. Cl.
CPC ......... *H04W 8/186* (2013.01); *H04W 4/005* (2013.01); *H04W 24/10* (2013.01); *H04W 84/18* (2013.01); *H04W 8/005* (2013.01)

(58) Field of Classification Search
CPC ...................................................... H04L 41/12
(Continued)

(56) References Cited

U.S. PATENT DOCUMENTS 6,317,475 B1 * 11/2001 Kasurinen ............ H04B 7/269
370/503
2009/0196277 A1    8/2009 Horn et al.
(Continued)

FOREIGN PATENT DOCUMENTS

CN     1855868      11/2006
CN    102461314     5/2012
(Continued)

OTHER PUBLICATIONS

PCT International Application No. PCT/KR2013/011730, Written Opinion of the International Searching Authority dated Apr. 9, 2014, 16 pages.
(Continued)

*Primary Examiner* — Samina Choudhry
(74) *Attorney, Agent, or Firm* — Lee Hong Dergerman Kang Waimey

(57) ABSTRACT

The present application discloses a method of performing group communication using user equipment (UE) in a wireless communication system. In particular, the method includes: detecting a first group of discovery signals having a first tier counter value; generating a second group of discovery signals having a second tier counter value by using the first value; and transmitting the second group of discovery signals to another UE, wherein the tier counter indicates a tier value to which the UE belongs based on an
(Continued)

initially activated UE or base station in the group communication.

8 Claims, 12 Drawing Sheets

Related U.S. Application Data filed on Jan. 8, 2013, provisional application No. 61/906,368, filed on Nov. 19, 2013.

(51) Int. Cl.
*H04W 4/00* (2009.01)
*H04W 24/10* (2009.01)
*H04W 84/18* (2009.01)
*H04W 8/00* (2009.01)

(58) Field of Classification Search
USPC .......................................................... 370/254
See application file for complete search history.

(56) References Cited

U.S. PATENT DOCUMENTS

| | | |
|---|---|---|
| 2009/0238214 A1 | 9/2009 | Hong |
| 2011/0149799 A1 | 6/2011 | Wu et al. |
| 2011/0170465 A1* | 7/2011 | Tavildar ............ H04W 56/0015 370/311 |
| 2014/0198655 A1* | 7/2014 | Ishii .................... H04W 76/023 370/235 |

FOREIGN PATENT DOCUMENTS

| | | |
|---|---|---|
| JP | 2002165269 | 6/2002 |
| JP | 2008219526 | 9/2008 |
| JP | 2009212946 | 9/2009 |
| JP | 2011526474 | 10/2011 |
| KR | 10-2008-0014529 | 2/2008 |
| KR | 10-2012-0010259 | 2/2012 |
| KR | 10-2012-0056533 | 6/2012 |
| RU | 2459360 | 8/2012 |
| WO | 2009099809 | 8/2009 |
| WO | 2011161560 | 12/2011 |
| WO | 2012011991 | 1/2012 |
| WO | 2012/060934 | 5/2012 |
| WO | 2012/117364 | 9/2012 |
| WO | 2012117364 | 9/2012 |
| WO | 2012165115 | 12/2012 |

OTHER PUBLICATIONS

European Patent Office Application Serial No. 13865287.0, Search Report dated Oct. 6, 2016, 13 pages.
Russian Federation Federal Service for Intellectual Property, Patents and Trademarks Application Serial No. 2015129554/07, Notice of Allowance dated Aug. 1, 2016, 16 pages.
The State Intellectual Property Office of the People's Republic of China Application Serial No. 201380067358.X, Office Action dated Apr. 5, 2017, 13 pages.

* cited by examiner

FIG. 2
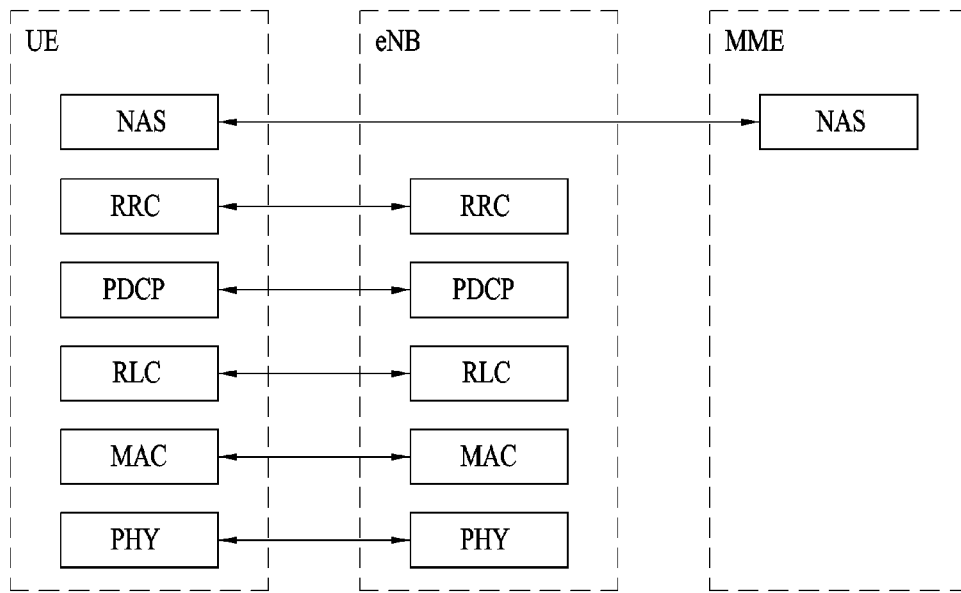
(A) CONTROL-PLANE PROTOCOL STACK
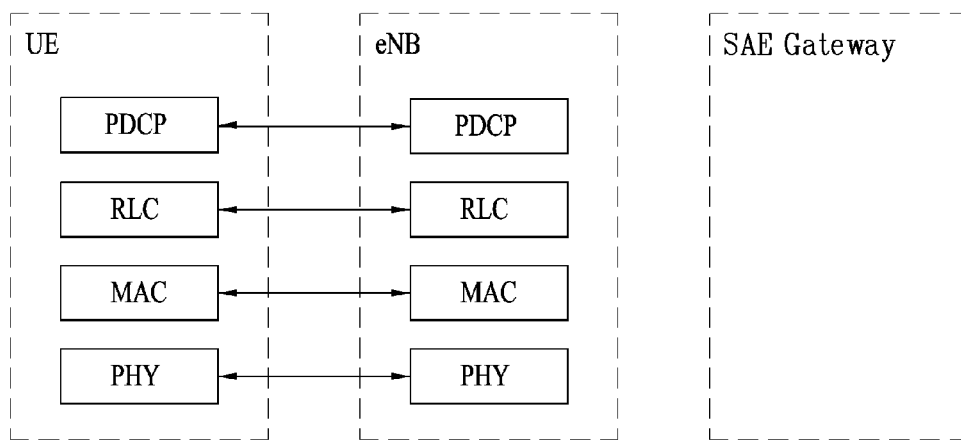
(B) USER-PLANE PROTOCOL STACK

METHOD AND DEVICE FOR PERFORMING GROUP COMMUNICATION USING DIRECT COMMUNICATION BETWEEN TERMINALS IN WIRELESS COMMUNICATION SYSTEM

CROSS-REFERENCE TO RELATED APPLICATIONS

This application is the National Stage filing under 35 U.S.C. 371 of International Application No. PCT/KR2013/ 011730, filed on Dec. 17, 2013, which claims the benefit of U.S. Provisional Application Nos. 61/740,425, filed on Dec. 20, 2012, 61/750,322, filed on Jan. 8, 2013 and 61/906,368, filed on Nov. 19, 2013, the contents of which are all hereby incorporated by reference herein in their entirety.

TECHNICAL FIELD

The present invention relates to a wireless communication system, and more particularly, to a method and apparatus for performing group communication by direct device-to-device communication in a wireless communication system.

BACKGROUND ART

3GPP LTE (3rd generation partnership project long term evolution hereinafter abbreviated LTE) communication system is schematically explained as an example of a wireless communication system to which the present invention is applicable.

FIG. 1 is a schematic diagram of E-UMTS network structure as one example of a wireless communication system. E-UMTS (evolved universal mobile telecommunications system) is a system evolved from a conventional UMTS (universal mobile telecommunications system). Currently, basic standardization works for the E-UMTS are in progress by 3GPP. E-UMTS is called LTE system in general. Detailed contents for the technical specifications of UMTS and E-UMTS refers to release 7 and release 8 of "3rd generation partnership project; technical specification group radio access network", respectively.

Referring to FIG. 1, E-UMTS includes a user equipment (UE), an eNode B (eNB), and an access gateway (hereinafter abbreviated AG) connected to an external network in a manner of being situated at the end of a network (E-UTRAN). The eNode B may be able to simultaneously transmit multi data streams for a broadcast service, a multicast service and/or a unicast service.

One eNode B contains at least one cell. The cell provides a downlink transmission service or an uplink transmission service to a plurality of user equipments by being set to one of 1.25 MHz, 2.5 MHz, 5 MHz, 10 MHz, 15 MHz, and 20 MHz of bandwidths. Different cells can be configured to provide corresponding bandwidths, respectively. An eNode B controls data transmissions/receptions to/from a plurality of the user equipments. For a downlink (hereinafter abbreviated DL) data, the eNode B informs a corresponding user equipment of time/frequency region on which data is transmitted, coding, data size, HARQ (hybrid automatic repeat and request) related information and the like by transmitting DL scheduling information. And, for an uplink (hereinafter abbreviated UL) data, the eNode B informs a corresponding user equipment of time/frequency region usable by the corresponding user equipment, coding, data size, HARQ-related information and the like by transmitting UL scheduling information to the corresponding user equipment. Interfaces for user-traffic transmission or control traffic transmission may be used between eNode Bs. A core network (CN) consists of an AG (access gateway) and a network node for user registration of a user equipment and the like. The AG manages a mobility of the user equipment by a unit of TA (tracking area) consisting of a plurality of cells.

Wireless communication technologies have been developed up to LTE based on WCDMA. Yet, the ongoing demands and expectations of users and service providers are consistently increasing. Moreover, since different kinds of radio access technologies are continuously developed, a new technological evolution is required to have a future competitiveness. Cost reduction per bit, service availability increase, flexible frequency band use, simple structure/open interface and reasonable power consumption of user equipment and the like are required for the future competitiveness.

DISCLOSURE

Technical Problem

An object of the present invention devised to solve the conventional problem is to provide a method and apparatus for performing group communication by direct device-to-device communication in a wireless communication system.

Technical Solution

In an aspect of the present invention, a method for performing group communication by a User Equipment (UE) in a wireless communication system includes detecting a first group discovery signal having a first tier count, generating a second group discovery signal having a second tier count using the first tier count, and transmitting the second group discovery signal to another UE. The tier count indicates a tier to which the UE belongs, with respect to a UE or Base Station (BS) that has initially activated the group communication.

The detection of a first group discovery signal may include detecting a third group discovery signal having a third tier count, and the generation of a second group discovery signal may include generating the second group discovery signal using a smaller tier count between the tier count of the first group discovery signal and the tier count of the third group discovery signal. The signal qualities of the first group discovery signal and the third group discovery signal may be equal to or larger than a predetermined threshold.

In another aspect of the present invention, a UE for performing group communication in a wireless communication system includes a wireless communication module configured to transmit and receive signals, and a processor configured to process the signals. The processor is configured to detect a first group discovery signal having a first tier count, generate a second group discovery signal having a second tier count using the first tier count, and transmit the second group discovery signal to another UE. The tier count indicates a tier to which the UE belongs, with respect to a UE or BS that has initially activated the group communication.

The processor may detect a third group discovery signal having a third tier count, and generate the second group discovery signal using a smaller tier count between the tier count of the first group discovery signal and the tier count of the third group discovery signal. The signal qualities of the first group discovery signal and the third group discovery signal may be equal to or larger than a predetermined threshold.

In the above embodiments, if the first group discovery signal is transmitted by the UE or BS that has initially activated the group communication, the first tier count may be 0. The second tier count may be a value obtained by adding 1 to the first tier count.

A minimum of the tier counts may be changed depending whether the group communication has been activated initially by the BS or the specific UE.

Advantageous Effects

According to the embodiments of the present invention, a group communication method can be performed more efficiently by direct device-to-device communication in a wireless communication system.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 2 is a diagram showing a control plane and a user plane of a radio interface protocol architecture between a User Equipment (UE) and an Evolved Universal Terrestrial Radio Access Network (E-UTRAN) based on a 3rd Generation Partnership Project (3GPP) radio access network standard.

BEST MODE FOR CARRYING OUT THE INVENTION

Figure 1:
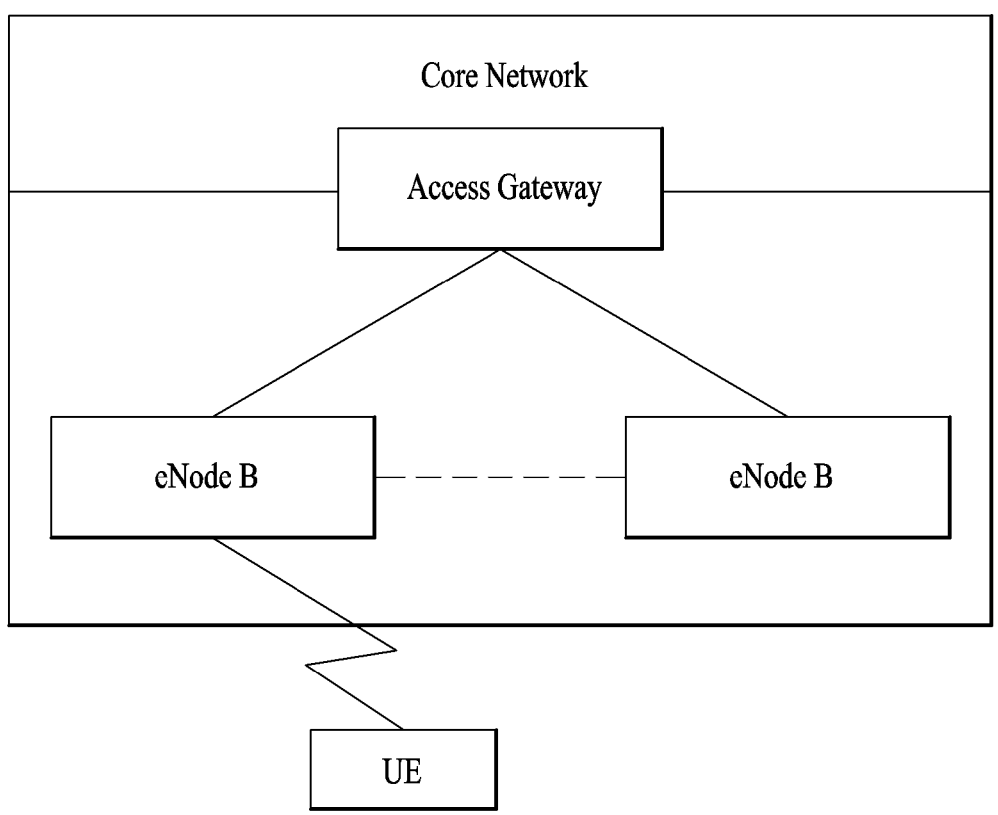
FIG. 1 is a diagram showing a network structure of an Evolved Universal Mobile Telecommunications System (E-UMTS) as an example of a wireless communication system.

In the following description, compositions of the present invention, effects and other characteristics of the present invention can be easily understood by the embodiments of the present invention explained with reference to the accompanying drawings. Embodiments explained in the following description are examples of the technological features of the present invention applied to 3GPP system.

In this specification, the embodiments of the present invention are explained using an LTE system and an LTE-A system, which is exemplary only. The embodiments of the present invention are applicable to various communication systems corresponding to the above mentioned definition. In particular, although the embodiments of the present invention are described in the present specification on the basis of FDD, this is exemplary only. The embodiments of the present invention may be easily modified and applied to H-FDD or TDD.

FIG. 2 is a diagram for structures of control and user planes of radio interface protocol between a 3GPP radio access network standard-based user equipment and E-UTRAN. The control plane means a path on which control messages used by a user equipment (UE) and a network to manage a call are transmitted. The user plane means a path on which such a data generated in an application layer as audio data, internet packet data, and the like are transmitted.

A physical layer, which is a 1st layer, provides higher layers with an information transfer service using a physical channel. The physical layer is connected to a medium access control layer situated above via a transport channel (trans antenna port channel). Data moves between the medium access control layer and the physical layer on the transport channel. Data moves between a physical layer of a transmitting side and a physical layer of a receiving side on the physical channel. The physical channel utilizes time and frequency as radio resources. Specifically, the physical layer is modulated by OFDMA (orthogonal frequency division multiple access) scheme in DL and the physical layer is modulated by SC-FDMA (single carrier frequency division multiple access) scheme in UL.

Medium access control (hereinafter abbreviated MAC) layer of a 2nd layer provides a service to a radio link control (hereinafter abbreviated RLC) layer, which is a higher layer, on a logical channel. The RLC layer of the 2nd layer supports a reliable data transmission. The function of the RLC layer may be implemented by a function block within the MAC. PDCP (packet data convergence protocol) layer of the 2nd layer performs a header compression function to reduce unnecessary control information, thereby efficiently transmitting such IP packets as IPv4 packets and IPv6 packets in a narrow band of a radio interface.

Radio resource control (hereinafter abbreviated RRC) layer situated in the lowest location of a 3rd layer is defined on a control plane only. The RRC layer is responsible for control of logical channels, transport channels and physical channels in association with a configuration, a re-configuration and a release of radio bearers (hereinafter abbreviated RBs). The RB indicates a service provided by the 2nd layer for a data delivery between the user equipment and the network. To this end, the RRC layer of the user equipment and the RRC layer of the network exchange a RRC message with each other. In case that there is an RRC connection (RRC connected) between the user equipment and the RRC layer of the network, the user equipment lies in the state of RRC connected (connected mode). Otherwise, the user equipment lies in the state of RRC idle (idle mode). A non-access stratum (NAS) layer situated at the top of the RRC layer performs such a function as a session management, a mobility management and the like.

A single cell consisting of an eNode B (eNB) is set to one of 1.25 MHz, 2.5 MHz, 5 MHz, 10 MHz, 15 MHz, and 20 MHz of bandwidths and then provides a downlink or uplink transmission service to a plurality of user equipments. Different cells can be configured to provide corresponding bandwidths, respectively.

DL transport channels for transmitting data from a network to a user equipment include a BCH (broadcast channel) for transmitting a system information, a PCH (paging channel) for transmitting a paging message, a downlink SCH (shared channel) for transmitting a user traffic or a control message and the like. DL multicast/broadcast service traffic or a control message may be transmitted on the DL SCH or a separate DL MCH (multicast channel). Meanwhile, UL transport channels for transmitting data from a user equipment to a network include a RACH (random access channel) for transmitting an initial control message, an uplink SCH (shared channel) for transmitting a user traffic or a control message. A logical channel, which is situated above a transport channel and mapped to the transport channel, includes a BCCH (broadcast channel), a PCCH (paging control channel), a CCCH (common control channel), a MCCH (multicast control channel), a MTCH (multicast traffic channel) and the like.

Figure 3:
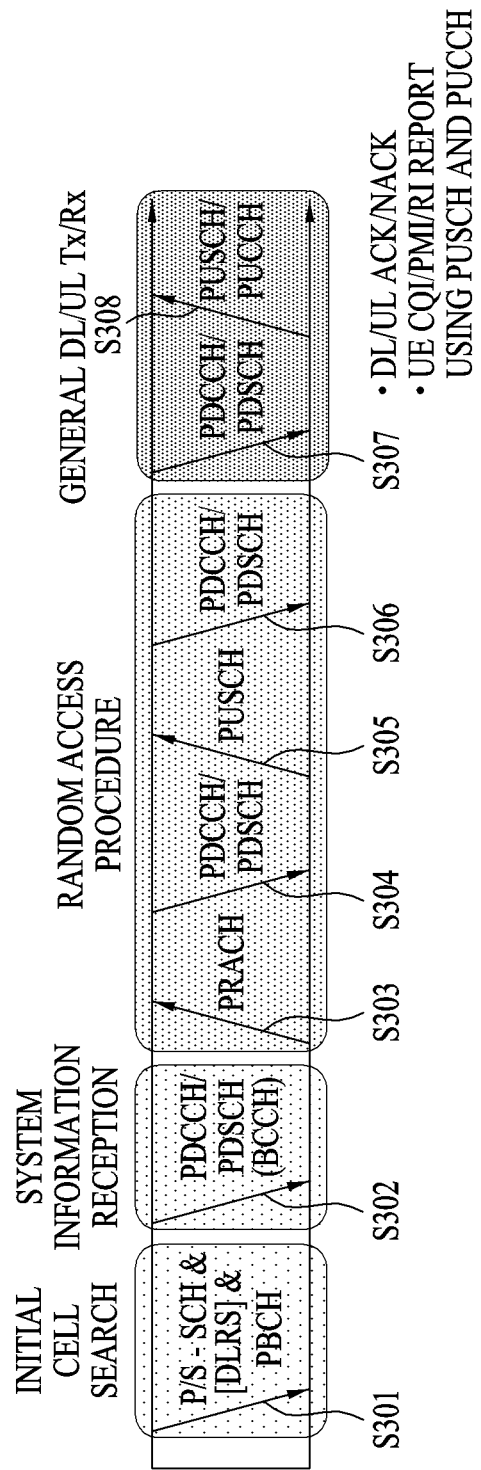
FIG. 3 is a diagram showing physical channels used in a 3GPP system and a general signal transmission method using the same.

FIG. 3 is a diagram for explaining physical channels used for 3GPP system and a general signal transmission method using the physical channels.

If a power of a user equipment is turned on or the user equipment enters a new cell, the user equipment may perform an initial cell search job for matching synchronization with an eNode B and the like [S301]. To this end, the user equipment may receive a primary synchronization channel (P-SCH) and a secondary synchronization channel (S-SCH) from the eNode B, may be synchronized with the eNode B and may then obtain information such as a cell ID and the like. Subsequently, the user equipment may receive a physical broadcast channel from the eNode B and may be then able to obtain intra-cell broadcast information. Meanwhile, the user equipment may receive a downlink reference signal (DL RS) in the initial cell search step and may be then able to check a DL channel state.

Having completed the initial cell search, the user equipment may receive a physical downlink shared control channel (PDSCH) according to a physical downlink control channel (PDCCH) and an information carried on the physical downlink control channel (PDCCH). The user equipment may be then able to obtain a detailed system information [S302].

Meanwhile, if a user equipment initially accesses an eNode B or does not have a radio resource for transmitting a signal, the user equipment may be able to perform a random access procedure to complete the access to the eNode B [S303 to S306]. To this end, the user equipment may transmit a specific sequence as a preamble on a physical random access channel (PRACH) [S303/S305] and may be then able to receive a response message on PDCCH and the corresponding PDSCH in response to the preamble [S304/S306]. In case of a contention based random access procedure (RACH), it may be able to additionally perform a contention resolution procedure.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. In particular, the user equipment receives a DCI (downlink control information) on the PDCCH. In this case, the DCI contains such a control information as an information on resource allocation to the user equipment. The format of the DCI varies in accordance with its purpose.

Meanwhile, control information transmitted to an eNode B from a user equipment via UL or the control information received by the user equipment from the eNode B includes downlink/uplink ACK/NACK signals, CQI (Channel Quality Indicator), PMI (Precoding Matrix Index), RI (Rank Indicator) and the like. In case of 3GPP LTE system, the user equipment may be able to transmit the aforementioned control information such as CQI/PMI/RI and the like on PUSCH and/or PUCCH.

Figure 4:
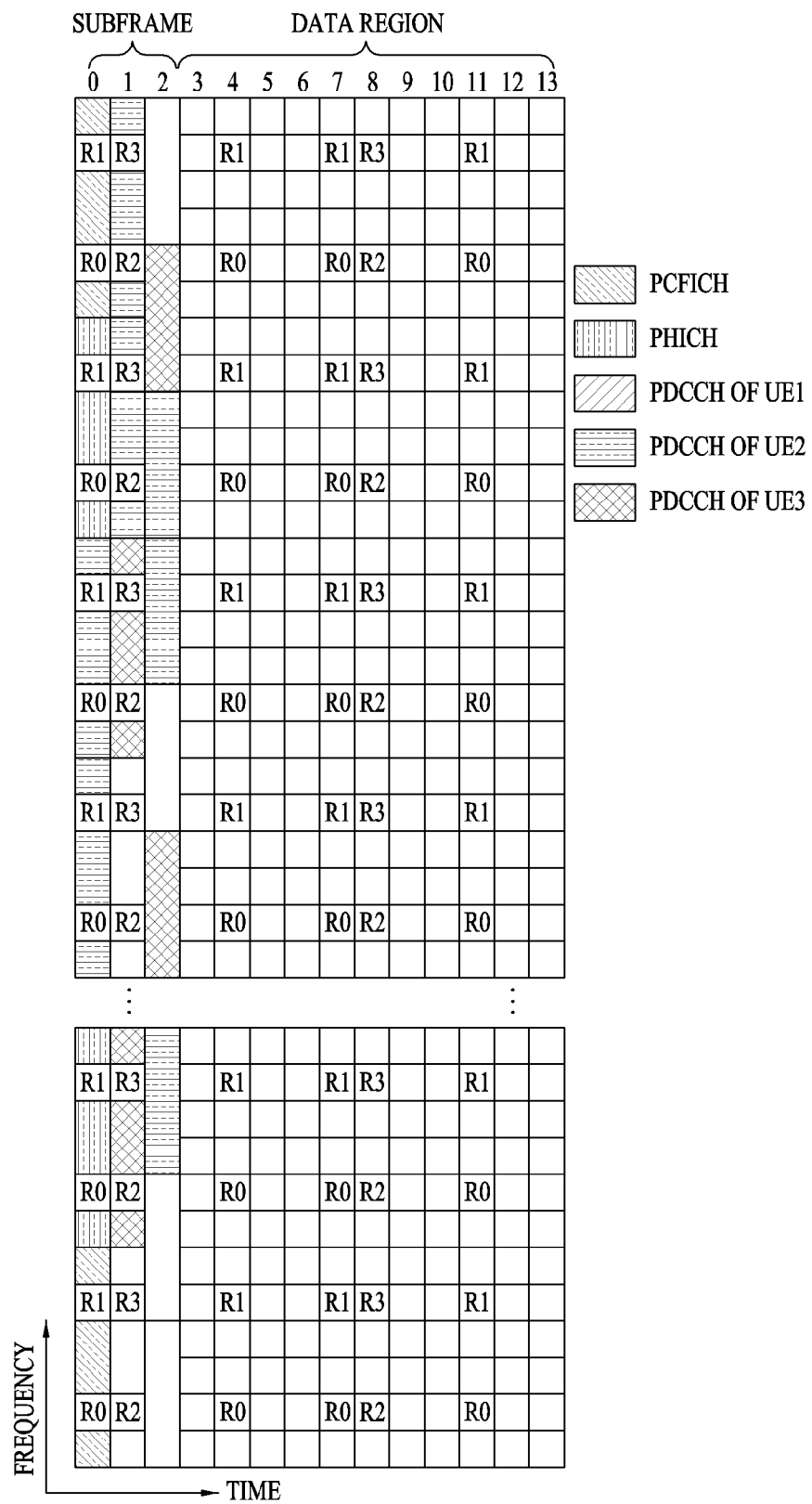
FIG. 4 is a diagram showing the structure of a downlink radio frame used in a Long Term Evolution (LTE) system.

FIG. 4 illustrates exemplary control channels included in a control region of a subframe in a DL radio frame.

Figure 5:
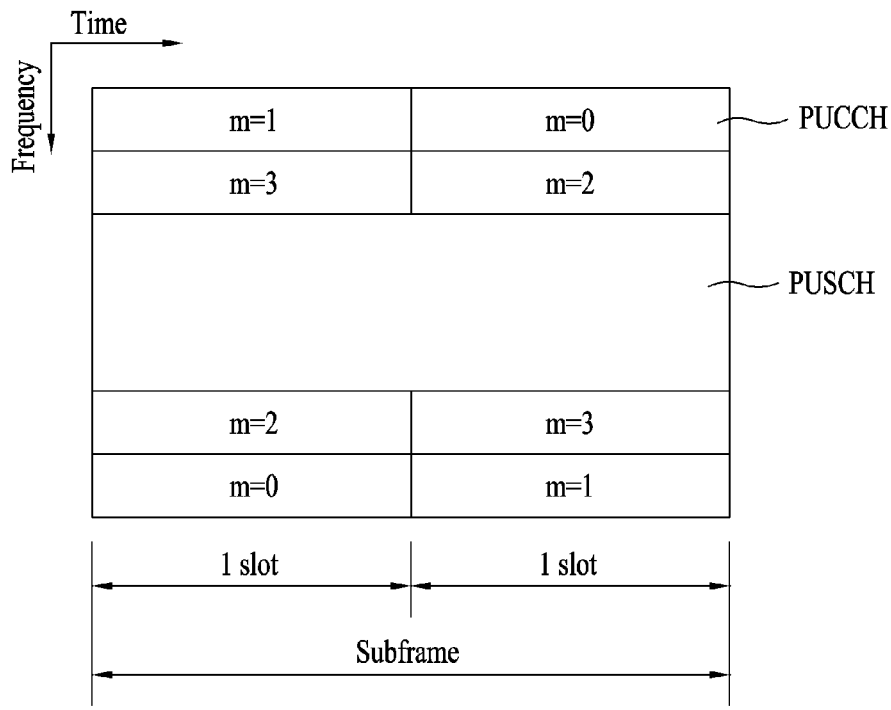
FIG. 5 is a diagram showing the structure of an uplink subframe used in an LTE system.

Referring to FIG. 4, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

A basic resource unit of a DL control channel is an REG. The REG includes four contiguous REs except for REs carrying RSs. A PCFICH and a PHICH include 4 REGs and 3 REGs, respectively. A PDCCH is configured in units of a Control Channel Element (CCE), each CCE including 9 REGs.

FIG. 5 illustrates a structure of a UL subframe in the LTE system.

Referring to FIG. 5, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 5.

Figure 6:
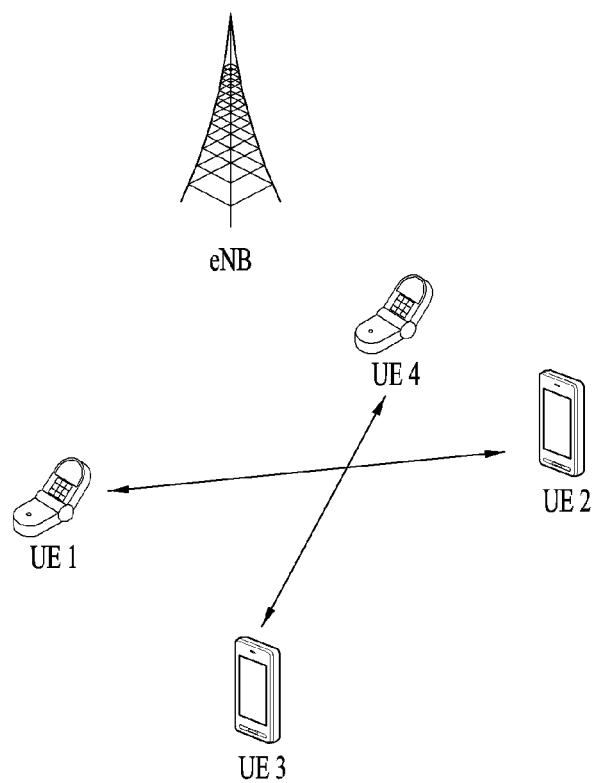
FIG. 6 is a diagram illustrating the concept of device-to-device (D2D) communication.

FIG. 6 is a diagram illustrating the concept of device-to-device (D2D) communication.

Referring to FIG. 6, a first UE (UE1) and a second UE (UE2) conduct direct communication with each other and a third UE (UE3) and a fourth UE (UE4) also conduct direct communication with each other. An eNB may control the position of time/frequency resources and transmission power for direct communication between UEs by appropriate control signals. However, if UEs are located outside the coverage of the eNB, the UEs may conduct direct communication without a control signal from the eNB. Hereinbelow, direct communication between UEs will be referred to as D2D communication.

Figure 7:
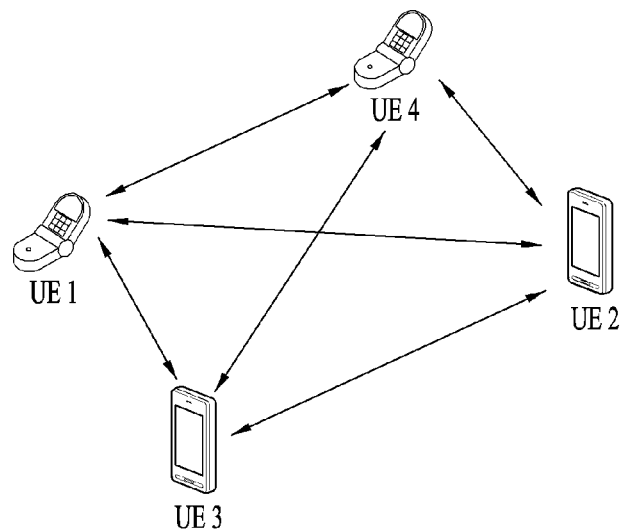
FIG. 7 is a diagram illustrating the concept of D2D communication-based group communication.

FIG. 7 is a diagram illustrating the concept of D2D communication-based group communication.

Referring to FIG. 7, it is noted that a plurality of UEs are grouped into a single group. It is assumed that one of the UEs transmits D2D communication information and all the UEs of the group receive the D2D communication information. This communication scheme is referred to as group communication, distinguishably from the communication scheme illustrated in FIG. 6. The communication scheme of FIG. 6 in which one UE transmits information only to one other UE is referred to as one-to-one communication.

While the following description is given of operations of the present invention in the context of D2D communication between UEs, the same thing is applicable to communication between an eNB and a UE. In this case, the eNB may be regarded as a special type of UE which participates in D2D communication.

To conduct group communication, a UE that intends to initiate the group communication should first activate the group communication. A group activation method will be described below.

If a specific UE has data to be transmitted to all UEs of a specific group to which the specific UE belongs, the UE activates the group and starts group communication. Group activation refers to an operation for notifying the other UEs of a group that group communication has started in the group by transmitting a specific signal allocated to the group to the other adjacent UEs by a UE. The specific signal allocated to the group may be referred to as a group discovery signal, in the sense that it is a signal that the UE transmits so that the other UEs may discover an activated group.

Typically for D2D communication, a UE should be able to determine whether a target UE for communication exists. Thus, a signal transmission/reception operation is performed. To distinguish a signal transmitted to determine the presence of a UE for one-to-one communication from a group discovery signal, the former is referred to as a UE discovery signal.

The difference between a group discovery signal and a UE discovery signal lies in that a UE discovery signal is generated based on individual information such as an ID of a transmitting/receiving UE and thus an existing UE is identified by detecting a UE discovery signal of the existing UE, whereas since a UE of a group transmits a group discovery signal, the activated group is identified by detecting the group discovery signal but the transmitting UE cannot be identified.

To design and manage the two types of discovery signals in an integrated manner, the discovery signals may be generated from one seed value, and a UE discovery signal and a group discovery signal may be distinguished depending on whether the seed value is determined from a UE ID or a pre-allocated group ID. For example, a whole seed value area available to discovery signals may be divided into two parts and one part may be used for UE discovery signals, whereas the other part may be used for group discovery signals. Further, even though a specific UE is placed in a situation where it is supposed to transmit a group discovery signal, the UE may need to additionally perform one-to-one D2D communication. Thus, the UE may transmit its UE discovery signal as well as the group discovery signal.

As described above, in the presence of data to be transmitted to other UEs of a group, a UE transmits a group discovery signal of the group, starting group communication. Another difference between a group discovery signal and a UE discovery signal is that the UE discovery signal is preferably transmitted at least once within a predetermined time irrespective of the presence or absence of transmission data for one-to-one communication. This is done to enable another UE that wants one-to-one D2D communication with the UE to determine whether D2D communication with the UE can be conducted. On the other hand, since the group discovery signal indicates whether group communication has been activated, the group discovery signal is not transmitted in the absence of data for the group communication. In other words, a UE having no data to be transmitted to other UEs of its group does not transmit a group discovery signal.

Even though a specific UE has discovered another UE of the same group by a UE discovery signal, if the UE has not received a group discovery signal of the group, the UE may not perform a group communication-related operation, determining that the group has not been activated, at least in the absence of data to be transmitted by group communication. Consequently, the UE may reduce battery consumption. On the contrary, if the UE detects the group discovery signal of its group, the UE joins activated group communication by a series of operations, considering that the detection of the group discovery signal amounts to activation of group communication in the group.

Figure 8:
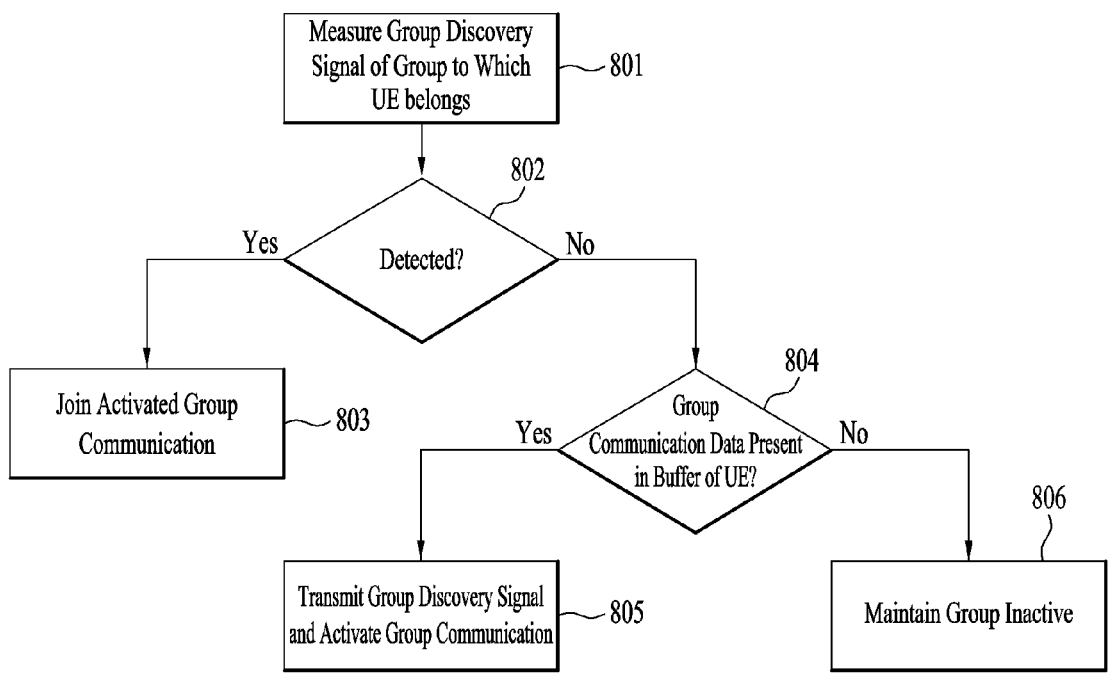
FIG. 8 is a flowchart illustrating an exemplary operation for activating group communication and transmitting and receiving a group discovery signal according to an embodiment of the present invention.

FIG. 8 is a flowchart illustrating an exemplary operation for activating group communication and transmitting and receiving a group discovery signal according to an embodiment of the present invention.

Referring to FIG. 8, a UE measures a group discovery signal of a group to which the UE belongs in step 801 and determines whether the group discovery signal has been detected in step 802.

Upon detection of the group discovery signal, the UE joins already-activated group communication in step 803. On the other hand, if the group discovery signal has not been detected, the UE determines whether group communication data exists in its buffer in step 804. In the presence of group communication data, the UE activates group communication by transmitting a group discovery signal in step 805. On the contrary, in the absence of group communication data, the UE keeps the group inactive in step 806. The UE determines whether its group has been activated by periodically repeating the above operation.

A description will be given of a method for joining already-activated group communication by a UE according to the present invention.

After a UE detects a group discovery signal as described above and determines that communication of its group has already been activated, the UE joins the group communication. Joining group communication means that the UE performs an overall operation for receiving data directed to the UEs of the group. That is, as the specific UE detects an existing group discovery signal of the group and joins the group, the UE is capable of communicating with the UEs of the already-formed group.

To transmit and receive wireless communication signals within a group, UEs of the group should generally be synchronized with one another. This is a process of joining a group by a UE that has detected a group discovery signal. This group discovery signal may be a synchronization reference for group communication. That is, if a specific UE detects an existing group discovery signal and acquires synchronization with a corresponding group based on the group discovery signal, the UE may be capable of joining the group and performing group communication in the group.

For example, the UE may detect the group discovery signal and determine a time point for transmitting or receiving a group communication signal based on a reception time of the group discovery signal. In this case, the group discovery signal may be referred to as a synchronization signal or synchronization channel that provides synchronization between the UEs of the group.

In addition, the UE that has joined the activated group communication may transmit the group discovery signal so that UEs of the same group adjacent to the UE may join the group communication. That is, the UE joining the activated group also transmits the group discovery signal. The following methods described in 1), 2), and 3) are given as specific embodiments for transmitting a group discovery signal by a new UE added to an activated group.

1) Method 1 for Transmitting Group Discovery Signal

A UE transmits the same signal as a group discovery signal detected by the UE. As a result, the UE may transmit the same group discovery signal together with existing UEs of the same group at a specific time point. Moreover, the same time/frequency resource position may be configured for the UEs, for transmission of the group discovery signal. Or to allow other UEs of the group to receive the group discovery signal from a UE and determine whether the group has been kept active, different time points for transmitting the group discovery signal may be set for different UEs. For example, whether to transmit/receive the group discovery signal at a specific time point may be set determined for each UE or whether to transmit/receive the group discovery signal at each time point may be determined probabilistically, according to a pseudo random sequence generated from an ID of a UE.

2) Method 2 for Transmitting Group Discovery Signal

A UE may indicate that it has been added to already-activated group communication by transmitting a signal other than a group discovery signal detected by the UE. However, since the same group should be indicated by the transmitted signal, the transmitted signal and the received group discovery signal have a common feature to a certain extent.

For example, the group discovery signal may be configured based on additional information as well as an ID of the group to which the UE belongs. In this case, upon detection of the group discovery signal, a UE may determine the group for which group communication has been activated from a part corresponding to the group ID and may also determine other information from the additional information, that is, information indicating whether the UE transmitting the group discovery signal has initially activated group communication or has joined already-activated group communication. The additional information used for configuring the group discovery signal may be a value indicating direct connection to the UE that has initially activated the group communication or connection to the UE through a few other UEs. Hereinafter, the additional information will be referred to as tier count X in the sense that it indicates the number of tiers by which a specific UE is apart from a UE that has initially activated group communication.

Figure 9:
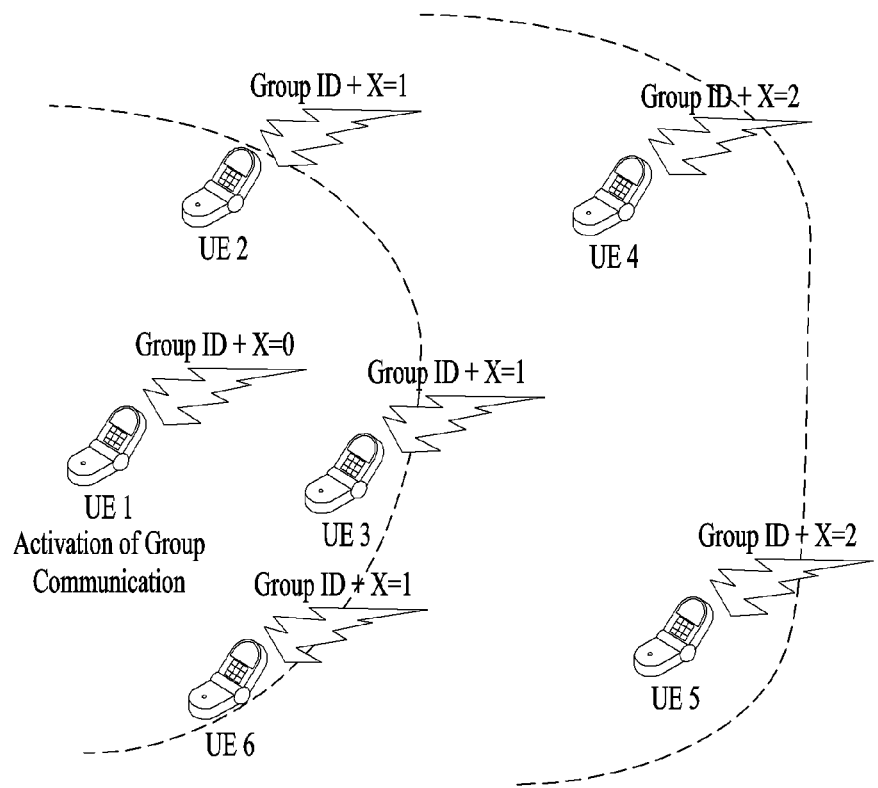
FIG. 9 illustrates an exemplary tier counting operation according to an embodiment of the present invention.

FIG. 9 illustrates an exemplary tier counting operation according to an embodiment of the present invention.

Referring to FIG. 9, UE1 activates group communication and sets tier count X to 0, determining that group communication has not been activated in a group to which UE1 belongs. Upon receipt of tier count 0 directly from UE1, UE2 and UE3 generate a new group discovery signal by increasing the tier count by 1 and transmit the generated group discovery signal. UE4 and a fifth UE (UE5) at the next tier perform the same operation. As a result, this operation brings about the effect of naturally extending the coverage of the activated group communication.

Like a sixth UE (UE6) that operates later, one UE may receive group discovery signals that belong to the same group and have different tier counts (e.g., the group discovery signals from UE1 and UE3). In this case, the UE may set its tier count by one of the following methods described in a), b), and c).

a) Tier Count Selection Criterion 1

The UE selects a minimum of the tier counts of received group discovery signals and sets its tier count by adding 1 to the minimum tier count. Herein, the 'received group discovery signals' may be limited to group discovery signals having quality levels equal to or higher than a predetermined level. The signal quality of a discovery signal may be represented as the received signal strength or Signal-to-Interference and Noise Ratio (SINR) of the discovery signal. In the embodiment illustrated in FIG. 9, UE6 sets tier count X to 1 according to this criterion.

b) Tier Count Selection Criterion 2

The UE selects a group discovery signal having the best quality level from among received group discovery signals and sets its tier count by adding 1 to the tier count of the selected group discovery signal. Herein, the signal quality of a discovery signal may be represented as the received signal strength or SINR of the discovery signal.

c) Tier Count Selection Criterion 3

The UE selects one of received group discovery signal, taking into account both the quality levels and tier counts of the group discovery signals. Although the UE basically selects the tier of a group discovery signal having a higher quality level, the UE selects a group discovery signal having a higher tier from among group discovery signals having similar quality levels by assigning a higher weight to a higher tier. For example, if the reception power of a discovery signal at tier m is Pm dBm, the UE may select a tier having a maximum value after (Pm-Axm) correction. A is a weight that makes a higher tier selected despite its lower power. This means that a correction value proportional to a received tier count is subtracted from reception power. In many other manners, a correction value may be defined according to a tier count.

3) Method 3 for Transmitting Group Discovery Signal

Similarly to method 2 for transmitting a group discovery signal, a UE may generate a signal using predetermined additional information as well as an ID of a group to which the UE belongs. The additional information may be a whole or part of an ID of the UE (or a UE discovery signal of the UE). That is, a group discovery signal transmitted by a specific UE includes information identifying the transmitting UE in addition to an ID of an activated group to which the UE belongs.

If another UE receives the group discovery signal, the UE may identify the activated group and further acquire ID information about the UE transmitting the group discovery signal.

Characteristically, although the used UE ID information may be the whole UE ID, the UE ID information may be a compression of the UE ID, for example, a signal generated using only a part of the bits of the UE ID in order to prevent production of too many kinds of group discovery signals caused by use of entire UE IDs. Since the UE also transmits its UE discovery signal separately from the group discovery signal, if another UE detects the group discovery signal and the UE discovery signal of the UE at the same time, the UE may identify the UE that transmitted the group discovery signal by comparing partial UE ID information included in the group discovery signal with the detected UE discovery signal. This operation for determining which UE has transmitted a group discovery signal of which group may be useful to implementation of an operation for joining an activated group by a UE as described below.

The foregoing method 2 for transmitting a group discovery signal and method 3 for transmitting a group discovery signal may be used in combination.

Figure 10:
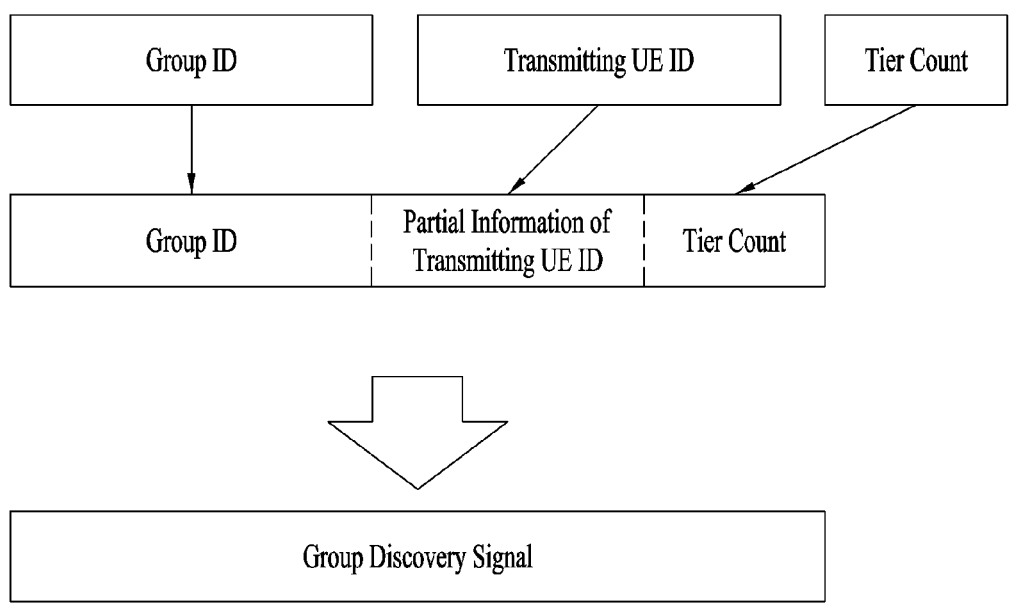
FIG. 10 illustrates an exemplary structure of a group discovery signal according to an embodiment of the present invention.

FIG. 10 illustrates an exemplary structure of a group discovery signal according to an embodiment of the present invention.

Referring to FIG. 10, a group discovery signal may be generated from a bit sequence in which a group ID, a transmitting UE ID, and a tier count are combined. Herein, it is assumed that only a part of the bits of the UE ID is used in generating the group discovery signal.

The above-described methods for transmitting a group discovery signal may be used for different usages. Accordingly, they may be selectively used according to the property of group communication. For example, if a plurality of UEs in the same group transmit the same signal in method 1 for transmitting a group discovery signal, the propagation area of the discovery signal may be extended by the effect of increasing the transmission power of the discovery signal. In the case where group communication is performed in the event of an emergency such as a fire or natural disaster, this operation advantageously enables each UE to fast join a group.

However, if a group discovery signal is transmitted within the coverage of an eNB in this manner, the transmission power of the group discovery signal may be increased beyond control of the eNB, causing severe interference to other communication links. To avert this problem, the eNB or a specific representative UE (e.g., a UE that has initially activated a corresponding group) may control the transmission of the group discovery signal, the number of UEs transmitting the group discovery signal, or the probability of each UE joining transmission of the group discovery signal by appropriate signaling. It is preferred that a relatively low transmission power of the group discovery signal or a relatively low probability of joining transmission of the group discovery signal is set for a UE located at the center of the activated group, whereas the transmission power of the group discovery signal or the probability of joining transmission of the group discovery signal is maintained unchanged or, if ever, is set to be low relative to the UE located at the center of the activated group, for a UE located at the edge of the activated group. Or a UE may autonomously operate in such a manner that the whole transmission power of the group discovery signal may be controlled. For example, each UE may measure the reception power of the group discovery signal of the group and, if the reception power is equal to or higher than a predetermined value, reduce its transmission power or its probability of transmitting the group discovery signal.

On the other hand, in the case of group communication in a less emergent situation, a specific UE may join an already-activated group using information included in a group discovery signal in method 2 or 3 for transmitting a group discovery signal, thereby performing a more effective group communication operation.

In an example of selecting a different group discovery signal transmission method according to a service property, a group discovery signal transmission method may be preset for each group ID. Particularly, an available total group ID area may be divided into a plurality of sub-areas, a group discovery signal transmission method may be preset for each sub-area, and then a group ID for which a group discovery signal transmission method has been preset may be assigned to each group communication service.

Meanwhile, in the case where a plurality of UEs in the same group transmit the same signal in method 1 for transmitting a group discovery signal, UEs joining the group may retransmit received D2D data for group communication to other UEs, considering this as an implicit indicator indicating that the UEs of the group are supposed to transmit the same signal to thereby maximize the coverage of the group communication. In this case, to combine the power of data transmitted by a plurality of UEs, a time/frequency position or Modulation and Coding Scheme (MCS) may be preset for a transmission signal or it may be regulated that the same time/frequency position or MCS as used for received data is used for the transmission signal, so that the plurality of UEs may transmit the same signal.

As a modification of method 1 for transmitting a group discovery signal, a special signal indicating the presence of an adjacent group may be transmitted simultaneously to all UEs of the group in the event of an emergency. A UE that has joined the group for which the special signal transmission has been configured transmits the special signal at a predetermined time point so that even a remote UE may receive the special signal with the transmission power of all of the UEs. The special signal may be configured as a kind of group discovery signal or any other Reference Signal (RS) such as Cell-specific Reference Signal (CRS), Demodulation Reference Signal (DM-RS), Positioning Reference Signal (PRS), MBSFN RS, SRS, Primary Synchronization Signal (PSS), or Secondary Synchronization Signal (SSS) as defined for the 3GPP LTE system. The property of the special signal may be predefined. Discovery of a group to which a UE placed in an emergency will belong with as minimal battery consumption as possible is important to the UE. Accordingly, the UE has only to attempt to detect the special signal, thereby reducing battery consumption in determining the presence or absence of the group. Once the UE detects the special signal, the UE may enter a group discovery signal detection stage that may be more complicated and consume more battery power, on the assumption that there are UEs conducting group communication near to the UE.

A UE that has set its tier count to X may consider that it has joined group communication having tier count 'X−1'. Although it is assumed in the embodiment of FIG. 9 that a UE activating group communication initially sets its tier count to 0, it may be more preferable for the UE to set the tier count to any other value.

For example, if a UE intends to initially activate group communication, the UE may probabilistically select a value from a predetermined range as its tier count. This operation may be favorable especially when a plurality of groups are activated in geographically spaced areas and then united into one group as UEs move and meet in the midway. That is, another group may be integrated into a group starting with a smaller value in the initial group communication activation stage. For this purpose, even though a specific UE joins an activated group, the UE may continuously attempt to discover a discovery signal of the group to which the UE belongs. Upon detection of a discovery signal of the same group, having a tier count smaller than a value obtained by subtracting 1 from its tier count, the UE may update its tier count by adding 1 to the corresponding tier count. Thus, the group of the UE may be integrated into a corresponding group.

During the above operation, a UE that initially activates group communication may select its tier count from a range of [0, N−K−1]. N−1 indicates a maximum tier count and K indicates a maximum number of tiers available for activated group communication. As the UE selects an initial tier count from the range of [0, N−K−1], the UE may ensure the maximum number of tiers using the given tier count range.

Or the UE that activates group communication initially may always set its tier count to 0, select a sub-group ID expressed as a probabilistically selected number to identify the activated group, and additionally use the sub-group ID in generating a group discovery signal. If the UE discovers a plurality of activated groups in an environment where sub-group IDs are used, a sub-group which the UE will join may be a sub-group having a smaller sub-group ID or a smaller tier count. One of the criteria may be used in the first place and when a decision cannot be made based on the criterion, another criterion may be used.

Figure 11:
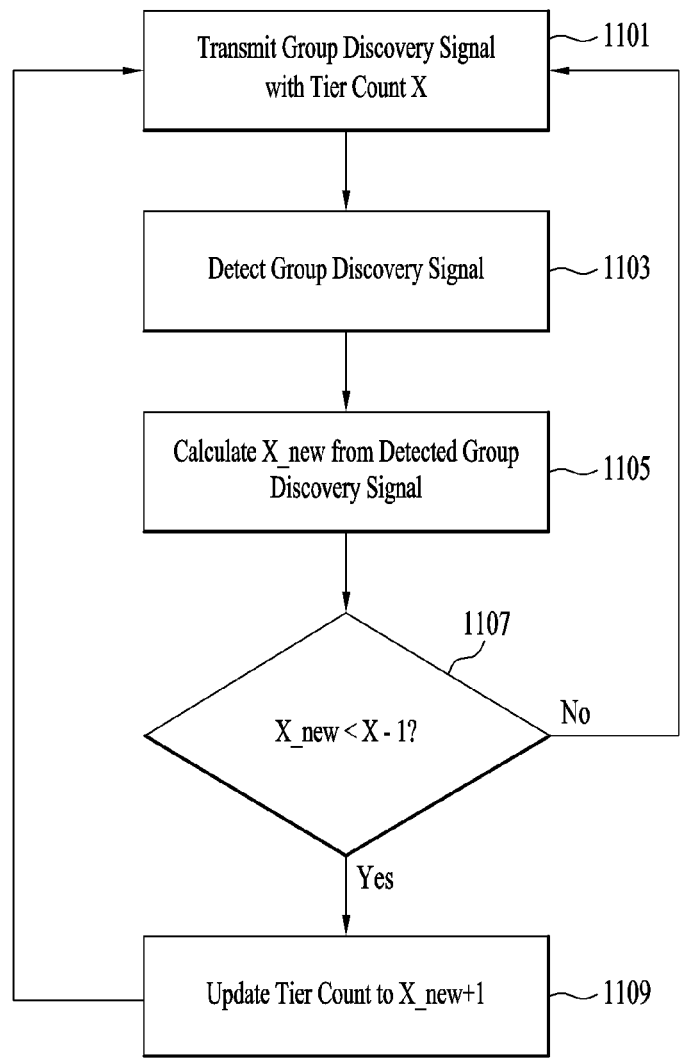
FIG. 11 is a flowchart illustrating an exemplary operation for setting a tier count according to an embodiment of the present invention.

FIG. 11 is a flowchart illustrating an exemplary operation for setting a tier count according to an embodiment of the present invention. Particularly, it is assumed in FIG. 11 that a UE transmits a group discovery signal with tier count X in step 1101.

Referring to FIG. 11, the UE detects a group discovery signal in step 1103 and calculates tier count X_new from the detected group discovery signal in step 1105.

In step 1107, the UE compares the tier count X_New with a value obtained by subtracting 1 from the existing tier count, that is, X−1. If X_new is equal to or larger than X−1, the UE transmits the group discovery signal with tier count X. On the other hand, if X_new is smaller than X−1, the UE updates tier count X to X_new+1 and transmits a discovery signal with tier count X_new+1 in step 1109.

Further, a UE that initially activates group communication may set tier count X to 0 or a specific random number. Since a UE that has not joined group communication does not transmit a discovery signal, the UE may consider that tier count X was set to a very large initial value, for example, an infinite value.

If a UE that initially activates group communication has not been connected to a cellular network, the UE may also set its tier count to a non-zero value. For example, if the UE determines that it is located outside the coverage of the cellular network, the UE may set its tier count to a sufficiently high value even though there is no activated group around the UE and the UE itself intends to activate group communication initially. As a result, in the case where UEs join a group by selecting a group discovery signal having a small tier count from among received group discovery signals, the UEs may select a group discovery signal transmitted within the coverage of the cellular network with priority. Especially considering that the cellular network provides a more stable communication service, this operation may induce a UE that newly joins group communication to connect to a UE nearer to the cellular network, thereby increasing the stability of the group communication.

In this case, a UE that initially activates group communication in the cellular network may set its tier count to 0. If the tier count of the initially activating UE may be increased to K, a UE that activates group communication outside the cellular network may select its tier count to (K+1) or a larger value. If it is assumed that an eNB can be regarded as a kind of UE and activate specific group communication even in D2D communication, a signal transmitted from the eNB, particularly a synchronization signal indicating the presence of the eNB may be considered to be a group discovery signal with tier count 0 and a UE that initially activates group communication actually within the coverage of the eNB may set its tier count to 1.

In an example of the above-described operation, the following tier count setting may be considered.

A UE that initially activates group communication within the coverage of an eNB sets its tier count to 1. Further, a signal from the eNB is regarded as a group discovery signal with tier count 0.

An upper limit of a tier count for group communication activated within the coverage of an eNB may be limited to K. That is, a UE receiving tier count X−1 may transmit a group discovery signal with tier count X which should be equal to or smaller than K. If X is larger than K, the UE may not transmit a group discovery signal separately.

A UE that initially activates group communication within the coverage of an eNB sets its tier count to K+a (a>0). In this case, another UE may receive a group discovery signal with a tier count larger than K and then recognize that this signal is from an initially activated group outside the coverage of the eNB. If a=1, an operation for receiving a group discovery signal with tier count K by a specific UE may be defined. For example, if the UE is located within the coverage of the eNB, the upper limit of the tier count is imposed and thus the UE does not transmit a new group discovery signal. On the other hand, if the UE is located outside the coverage of the eNB, the UE may set its tier count to K+1 and transmit a group discovery signal with tier count K+1 since tier count K+1 may be regarded as an initial group activation signal. That is, if a received tier count is K+1, the UE regards it as a signal from a UE that has initially activated a group outside the coverage of the eNB. If the received tier count is K, the UE regards it as the last tier of activated groups within the coverage of the eNB. If a>1, there is a certain gap between a maximum tier count K of activated groups within the coverage of the eNB and a minimum tier count K+a of activated groups outside the coverage of the eNB. Therefore, upon receipt of any group discovery signal, a UE may determine the situation of an activated group from which the group discovery signal is.

A maximum tier count used in an activated group outside the coverage of an eNB may be limited to a specific value L. Characteristically, L may satisfy the condition that (L≤2K+a). If this condition is satisfied, a maximum tier count of an initial activated group outside the coverage of the eNB is equal to or smaller than a maximum tier count of an initial activated group within the coverage of the eNB. This condition may be enabled for the purpose of managing more tiers inside the coverage of the eNB in the sense that the eNB may provide a more stable communication service. In another sense, the condition may be used for the purpose of preventing generation of a group having too large a tier count, which may otherwise occur due to setting of a smaller maximum tier count for an activated group outside the coverage of the eNB.

In a specific example of the above-described tier counting operation, a case where a total of four values, 0, 1, 2, 3, and 4 are allocated by using 2 bits to represent a tier count may be considered. The value 0 may be regarded as indicating a signal transmitted by an eNB and a UE that initially activates a group substantially within the coverage of the eNB sets its tier count to 1. If K=1, this means that a group discovery signal may be relayed only once. That is, the eNB implicitly determines that a group discovery signal from a UE setting a tier count to 1 has been relayed from a UE within the coverage of the eNB. A UE that initially activates a group outside the coverage of the eNB may set a tier count to K+1, that is, 2 and detect a group discovery signal from an activated group outside the coverage of the eNB. A UE that relays the group discovery signal once may set a tier count to 3. In the case where L=3 and thus a group is initially activated outside the coverage of the eNB, only if a group discovery signal can be relayed only once, the four values may be used as described above.

If a specific UE joins activated group communication in the above method, the UE transmits and receives a group communication signal. A UE capable of direct communication with UE1 that has initially activated group communication, such as UE2 or UE3 in the example of FIG. 10 receives data directly from UE1. On the contrary, UE2 or UE3 located in the middle should transmit the information to UE4 or UE5 that is not capable of receiving a signal directly from UE1 despite in the same group. Likewise, data transmitted by UE4 or UE5 should be forwarded to UE1.

Now, a description will be given of specific embodiments of a method for forwarding information between UEs according to the present invention. Forwarding information between UEs means that a specific UE relays data generated not from the specific UE but from another UE of the same group to UEs of another group.

If a UE is to join activated group communication, the UE determines whether information needs to be forwarded between UEs in order to receive data from another UE. This determination may be made by checking a tier count as described before.

If the tier of the group communication that the UE wants to join is a UE that has initially activated the group communication, the group communication may be performed without information forwarding between UEs. Therefore, a UE that joins the UE that has initially activated the group communication does not require an operation for forwarding information between UEs. In this case, the UE that has initially activated the group communication may indicate that it is an initially activating UE by setting its tier count to 0. Particularly, the UE that has initially activated the group communication, that is, a UE belonging to a highest tier may basically relay received group communication data once.

Figure 12:
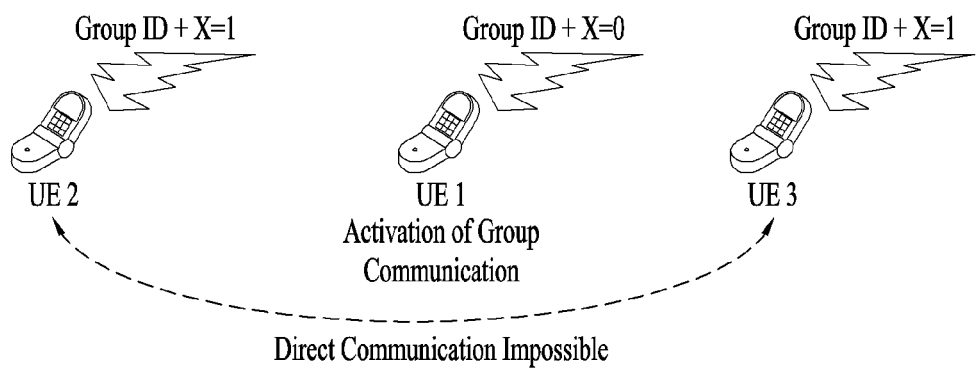
FIG. 12 illustrates an example of performing group communication according to an embodiment of the present invention.

FIG. 12 illustrates an example of performing group communication according to an embodiment of the present invention. Particularly, the illustrated case of FIG. 12 is based on the assumption that two UEs having tier count 1, UE2 and UE3 are far from each other and thus are not capable of direction communication.

Referring to FIG. 12, UE2 and UE3 are not capable of direct communication and may transmit information only through an initial activating UE having tier count 0, UE1. In this mechanism, therefore, upon receipt of group communication data generated from another UE, UE1 transmits the information at least once so that other UEs not capable of receiving the information directly may receive the information.

If the tier of the group communication that the specific UE wants to join is not the UE that has initially activated the group communication, the UE has difficulty in the group communication unless another UE that has already joined the activated group relays a signal. Accordingly, the UE, which is aware of this situation, determines whether a relay operation is being performed at a tier that the UE wants to join. For this purpose, transmission data for group communication may include an indicator indicating whether the data is transmitted from a data-originating UE or the indicator is transmitted from any other UE and thus the transmitting UE just relays the data. For example, a 1-bit field may be defined. Then the field may be set to 0 to indicate transmission of data generated directly from a UE and to 1 to indicate transmission of data generated from another UE.

The transmission data for group communication may include an address of a UE that has generated the data in addition to an address of a transmitting UE, so that it may be determined whether the data is relayed or not by comparing the addresses. In one method for representing a UE address, tier information about a transmitting UE and/or a data-generating UE may be included. A new UE that intends to join group communication attempts to receive data for the group communication. If the UE succeeds in the data reception and determines that the data has been relayed, the UE may skip an additional data relay request operation, determining that there is a UE that relays data of another UE within the coverage of the UE. On the other hand, if the UE has discovered a group to join but has failed to receive data from the group for a predetermined time or if ever, the data is determined to be generated from a transmitting UE, the UE may request a relay operation, determining that there is no relay UE within the coverage of the UE.

Figure 13:
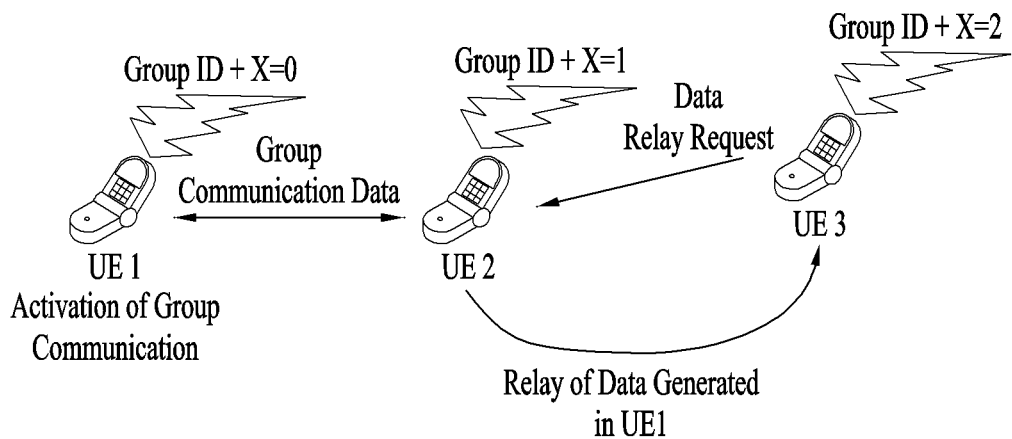
FIGS. 13 and 14 illustrate other examples of performing group communication according to embodiments of the present invention.
Figure 14:
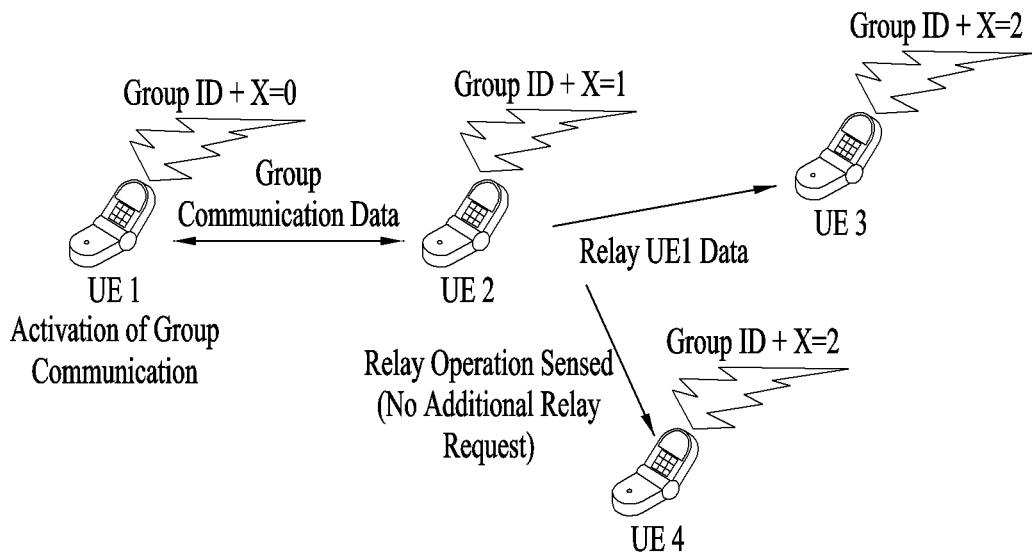

FIGS. 13 and 14 illustrate other examples of performing group communication according to embodiments of the present invention. Particularly, FIGS. 13 and 14 are about embodiments in which a UE determines whether to request a relay operation to another UE.

Referring to FIG. 13, UE3 that is to newly join group communication has discovered UE2 having tier count 1, as noted from FIG. 13. Because UE3 is capable of receiving data that UE2 directly transmits to UE1 but not capable of receiving data that is generated from UE1 at a higher tier, tier 0 and relayed by UE2, UE3 transmits a message requesting UE2 to relay data of another UE to UE3. On the other hand, referring to FIG. 14, UE4 that is to join the group communication has also discovered UE2 having tier count 1. However, since UE2 is performing a relay operation in response to the request of UE3, UE4 may sense such a relay signal and then continuously receive a relay signal from an existing relay UE, UE2, without transmitting a relay request signal.

Preferably, the UE may transmit the relay request signal by selecting a specific UE from the same group and conducting one-to-one communication with the selected UE. If two or more UEs of the same group have been discovered, the UE may select a UE according to the quality of a discovery signal, etc. Particularly, if a UE transmitting a group discovery signal may be identified in method 3 for transmitting a group discovery signal, it is preferable to request a relay operation to the UE that has transmitted the group discovery signal. To help the UE that is to join the group communication to determine whether to request the relay operation, information indicating whether each UE performs a relay operation and/or has a capability of the relay operation in generating a group discovery signal may further be included.

This operation may be applied to generation of a UE discovery signal. That is, a UE may include information indicating whether the UE is performing a relay operation and/or whether the UE has a relay capability in a UE discovery signal and transmit the UE discovery signal, so as to help a UE that detects the UE discovery signal to determine whether to request a relay operation. The information indicating whether the UE has a relay capability may include information indicating whether the UE has implemented a relay function. Further, information indicating whether the UE is capable of a relay operation in consideration of its current communication state may be included. For example, even though a specific UE implements a relay function, if the UE is almost out of battery power, the connection state between the UE and an eNB or another UE is poor, or the relay operation is disabled for the UE by a user setting, the UE may generate a discovery signal, determining that the relay operation is impossible. Or the UE may finally determine whether the corresponding UE has a relay capability and is placed in a relay-enabled situation by combining the above two pieces of information. If the relay operation is possible, the UE may indicate the availability of the relay operation by a discovery signal. It is obvious that the operation for including information related to execution of a relay operation of a UE during generation of a UE discovery signal is also applicable to one-to-one D2D communication other than group communication.

Or to enable a decision as to whether such a UE relay operation is needed, a UE that joins an existing activated group may report a list of UEs of the same group that it has discovered to a UE at a higher tier. Upon receipt of the UE list, the UE at the higher tier may determine whether the lower UEs of the same group have discovered one another. If the lower UEs are yet to further discover one another, the higher-tier UE may operate in such a manner that the UE relay operation may be performed.

For example, each of UE2 and UE3 may transmit a list of UEs in the same group, which it has discovered in the process of joining a group activated by UE1 in the illustrated case of FIG. 12. If the list reported by UE2 includes UE3 and the list reported by UE3 includes UE2, UE1 skips the relay operation, determining that direct communication is possible between the two UEs at a lower tier. On the contrary, if each of the reported lists does not include the other UE, UE1 determines that its relay operation is required. Particularly, the report of discovered UEs in the same group may be helpful for a highest-tier UE to determine whether a UE relay operation is required as described with reference to FIG. 12. Accordingly, the UE relay operation may be performed restrictively only when a UE joins a highest tier. If the UE joins any other tier, the UE may determine whether the UE relay operation is needed by the foregoing operation for requesting a UE relay operation.

Meanwhile, as a UE moves, a tier that the UE is to join may be changed. Therefore, if the UE has requested a relay operation and the tier to be joined has been changed, the UE may indicate that the relay operation is not needed any more to the requested UE by one-to-one communication. Also, in a situation where a specific UE is requested to relay or an existing relay UE is selected as a relay UE by receiving a signal from the UE, a UE discovery signal from the UE is continuously monitored. If the relay UE disappears, another UE may be selected and a relay request message may be transmitted to the selected UE.

In addition, the UE that is performing the relay operation also determines whether to continue its relay operation, while continuously monitoring UE discovery signals or group discovery signals from UEs at other tiers. For example, if the UE has failed to detect a group discovery signal from a lower tier, the UE may discontinue the relay operation, considering that the relay operation is not required any longer, thereby reducing as much resources and battery consumption. Or if a UE discovery signal of a UE requesting a relay operation to the UE has disappeared, the UE may discontinue the relay operation.

In the case where a specific UE has joined already-activated group communication without initially activating group communication, if the UE has not discovered a group discovery signal from a higher tier, the UE sets a tier count so as to act as a highest tier of its group along with movement of the UE, that is, as if it activated the group communication initially. To prevent a plurality of UEs from being at a highest tier, a specific probabilistic operation may be defined.

A transmission power control operation for group communication will be described below.

If a plurality of UEs receive data from a specific UE, different transmission power may be appropriate for them according to their locations. For example, UE2 and UE3 receive data from UE1. If UE2 is relatively near to UE1 and UE3 is relatively far from UE1, UE2 may determine that reduction of transmission power may not affect the group communication much, whereas UE3 may determine that transmission power needs to be increased. In general, a main purpose of group communication lies in that all UEs receive data stably. Thus, it is preferable to increase transmission power, taking into account the viewpoint of UE3 in this case.

Thus, the present invention proposes that when a plurality of UEs receive data from a single UE, only a UE determining that transmission power needs to be increased feeds back the need for power increase. Upon receipt of the feedback, a transmitting UE increases transmission power by a predetermined level, determining that at least one receiving UE has requested power increase. In the absence of any feedback signal, the transmitting UE may determine that the current transmission power is sufficient.

Because a plurality of UEs may transmit feedback signals simultaneously, it is preferred to preset time and frequency resources for transmission of the feedback signals. For example, it may be regulated that a feedback signal is transmitted a predetermined time after the end of data transmission. Also, since the feedback signals from the plurality of UEs should be received effectively, the feedback signals may be specific preset signatures and interpreted as using on-off keying. That is, transmission or non-transmission of a feedback signal may indicate whether a power increase is requested or not.

If the transmitting UE has not received any power increase request for a predetermined time or for a predetermined number of data transmissions, the transmitting UE may decrease the transmission power by a predetermined level, determining that the current transmission power is too high.

Figure 15:
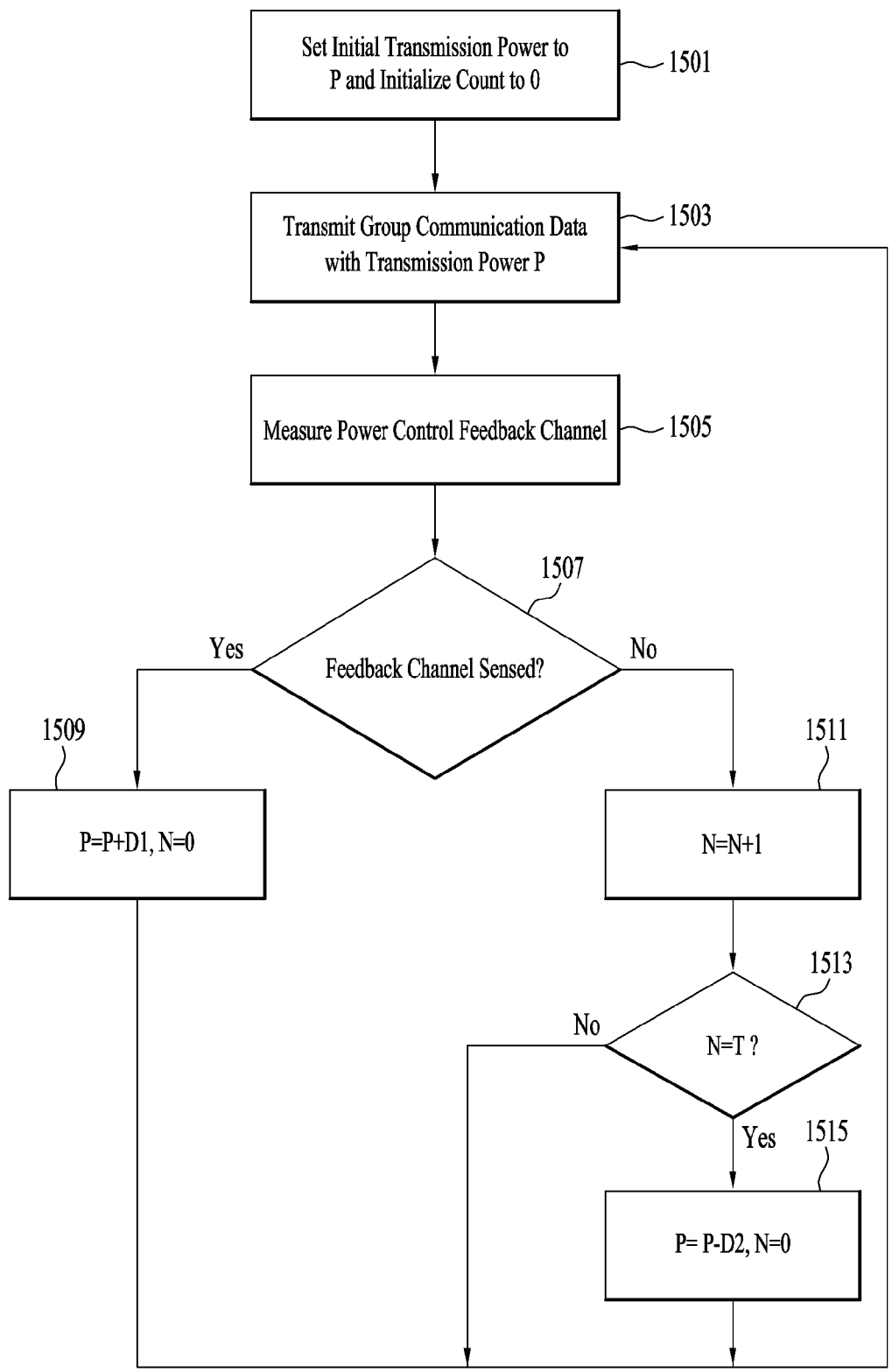
FIG. 15 is a flowchart illustrating an exemplary power control method for group communication according to an embodiment of the present invention.

FIG. 15 is a flowchart illustrating an exemplary power control method for group communication according to an embodiment of the present invention. Particularly in the illustrated case of FIG. 15, it is assumed that D1 and D2 are a power increment and a power decrement, respectively and transmission power is decreased in the absence of a feedback for T continuous transmissions.

Referring to FIG. 15, a UE (specifically, a transmitting UE in group communication) sets an initial transmission power level to P in step 1501 and transmits group transmission data at the transmission power level P in step 1503. Then the UE measures a power control feedback channel in step 1505 and determines whether a specific feedback has been received in step 1507.

In the presence of a specific feedback, the UE increases the transmission power level P by D1 and sets N to 0 in step 1509. On the other hand, in the absence of a specific feedback, the UE increases N by 1 in step 1511 and compares N with T in step 1513.

If N is not equal to T, the UE transmits group communication data at the transmission power level P in step 1503. On the contrary, if N is equal to T, the UE decreases the transmission power level by D2, sets N to 0, and then transmits group communication data at the transmission power level decreased by D2.

Although it is assumed in the above that a feedback from a UE indicates whether transmission power is sufficient, the feedback may indicate whether the quality of a signal received by the UE is equal to or larger than a desired level, for example, a level at which a signal may be received at or below a predetermined error probability. Especially, the desired signal quality may vary with an MCS used for group communication data. Upon receipt of the feedback indicating that the signal quality is equal to or lower than the desired level, the transmitting UE may deal with shortage of transmission power by controlling an MCS instead of the transmission power and thus using a low spectral efficiency scheme.

Transmission power control and MCS control may be used in combination. If the transmission power of a UE is low and a feedback indicates that a signal quality is equal to or lower than a desired level, the UE may increase the transmission power. However, even though the transmission power reaches a predetermined level, if a feedback indicates that a signal quality is equal to or lower than a desired level, the UE may keep the transmission power until receiving a next feedback, without further increasing the transmission power. However, this scheme may be confined to a situation where a used MCS has been configured to achieve a frequency efficiency equal to or higher than a predetermined value.

Figure 16:
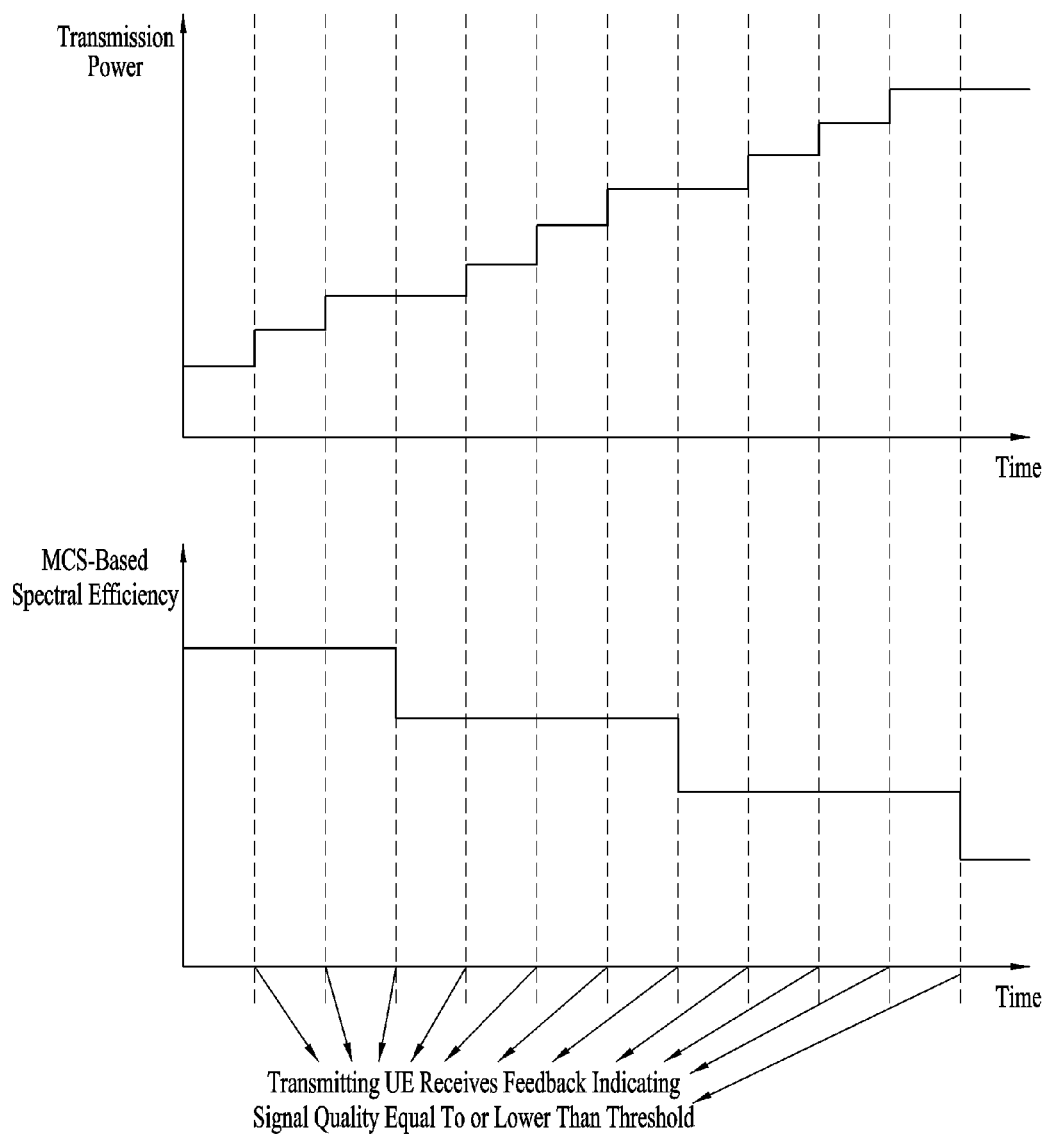
FIG. 16 is a flowchart illustrating an exemplary power control method for group communication according to an embodiment of the present invention.

FIG. 16 is a flowchart illustrating an exemplary power control method for group communication according to an embodiment of the present invention.

Referring to FIG. 16, if a specific transmitting UE continuously receives a feedback indicating that a signal quality is equal to or lower than a desired level, the specific transmitting UE controls transmission power and an MCS. Specifically, if the transmission power reaches a predetermined level during power increase, the UE decreases frequency efficiency of the MCS control scheme, keeping the transmission power unchanged. If the UE continuously receives the feedback, the UE repeatedly increases the transmission power until the transmission power reaches the predetermined level. It is apparent that the above-described principle of transmission power control and MCS control is also applicable to one-to-one D2D communication.

Figure 17:
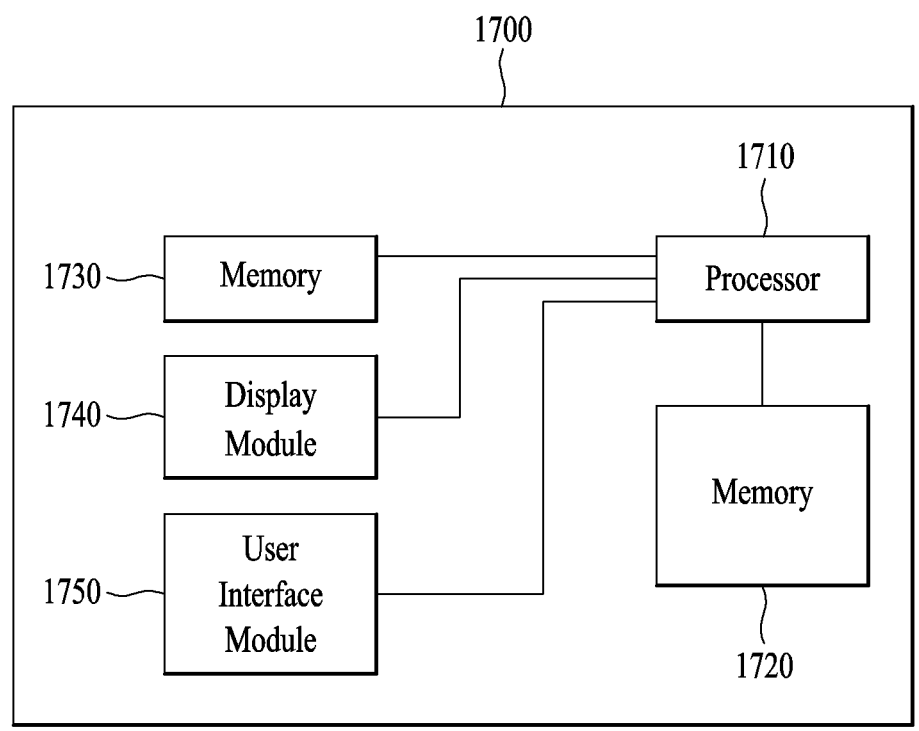
FIG. 17 is a block diagram of a communication apparatus according to an embodiment of the present invention.

FIG. 17 is a block diagram for an example of a communication device according to one embodiment of the present invention.

Referring to FIG. 17, a communication device 1700 may include a processor 1710, a memory 1720, an RF module 1730, a display module 1740, and a user interface module 1750.

Since the communication device 1700 is depicted for clarity of description, prescribed module(s) may be omitted in part. The communication device 1700 may further include necessary module(s). And, a prescribed module of the communication device 1700 may be divided into subdivided modules. A processor 1710 is configured to perform an operation according to the embodiments of the present invention illustrated with reference to drawings. In particular, the detailed operation of the processor 1710 may refer to the former contents described with reference to FIG. 1 to FIG. 16.

The memory 1720 is connected with the processor 1710 and stores an operating system, applications, program codes, data, and the like. The RF module 1730 is connected with the processor 1710 and then performs a function of converting a baseband signal to a radio signal or a function of converting a radio signal to a baseband signal. To this end, the RF module 1730 performs an analog conversion, amplification, a filtering, and a frequency up conversion, or performs processes inverse to the former processes. The display module 1740 is connected with the processor 1710 and displays various kinds of information. And, the display module 1740 can be implemented using such a well-known component as an LCD (liquid crystal display), an LED (light emitting diode), an OLED (organic light emitting diode) display and the like, by which the present invention may be non-limited. The user interface module 1750 is connected with the processor 1710 and can be configured in a manner of being combined with such a well-known user interface as a keypad, a touchscreen and the like.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A method for transmitting synchronization signals for a Device-to-Device (D2D) link at a user equipment (UE) in a wireless communication system, the method comprising;
   receiving, by the UE, one or more first synchronization signals for the D2D link from one or more first UEs, each of the one or more first synchronization signals providing information on a priority of a corresponding first synchronization signal,
   wherein the priority is determined based on whether the corresponding first synchronization signal is from a coverage providing a reception quality equal to or greater than a predetermined level;
   selecting, by the UE, one of the one or more first synchronization signals having a highest priority based on the reception quality;
   generating, by the UE, a second synchronization signal for the D2D link using the selected first synchronization signal when the reception quality of the selected first synchronization signal is lower than a threshold value; and
   transmitting, by the UE, the second synchronization signal to at least one second UE.

2. The method of claim 1, wherein generating the second synchronization signal comprises configuring a priority of the second synchronization signal using the priority of the selected first synchronization signal.

3. The method of claim 1, further comprising:
   obtaining a synchronization using the selected first synchronization signal.

4. The method of claim 1, wherein the priority is determined in decreasing order of a number of coverages through which the corresponding first synchronization signal is received.

5. A user equipment (UE) in a wireless communication system, the UE comprising:
   a receiver;
   a transmitter; and
   a processor operatively connected to the receiver and the transmitter, the processor configured to:
      receive one or more first synchronization signals for the D2D link from one or more first UEs, each of the one or more first synchronization signals providing information on a priority of a corresponding first synchronization signal,
      wherein the priority is determined based on whether the corresponding first synchronization signal is from a coverage providing a reception quality equal to or greater than a predetermined level;
      select one of the one or more first synchronization signals having a highest priority based on the reception quality;
      generate a second synchronization signal for the D2D link using the selected first synchronization signal when the reception quality of the selected first synchronization signal is lower than a threshold value; and
      transmit the second synchronization signal to at least one second UE.

6. The UE of claim 5, wherein the processor configures a priority of the second synchronization signal using the priority of the selected first synchronization signal.

7. The UE of claim 5, wherein the processor obtains a synchronization using the selected first synchronization signal.

8. The UE of claim 5, wherein the priority is determined in decreasing order of a number of coverages through which the corresponding first synchronization signal is received.

* * * * *